United States Patent [19]
Tanaka et al.

[11] Patent Number: 5,311,306
[45] Date of Patent: May 10, 1994

[54] MOTION DETECTING CIRCUIT FOR VIDEO SIGNAL PROCESSOR

[75] Inventors: Seiichi Tanaka; Takashi Koga; Kouichi Kurihara, all of Yokohama, Japan

[73] Assignee: Kabushiki Kaisha Toshiba, Kawasaki, Japan

[21] Appl. No.: 914,385

[22] Filed: Jul. 17, 1992

[30] Foreign Application Priority Data

Jul. 19, 1991 [JP] Japan .................. 3-179856

[51] Int. Cl.⁵ .................. H04N 9/77; H04N 9/78; H04N 9/79
[52] U.S. Cl. .................. 348/105; 348/488; 348/663
[58] Field of Search .................. 358/105, 316, 31, 12; H04N 9/77, 9/78, 9/79

[56] References Cited

U.S. PATENT DOCUMENTS

| | | | |
|---|---|---|---|
| 5,148,270 | 9/1992 | Someya | 358/12 |
| 5,150,207 | 9/1992 | Someya | 358/12 |
| 5,155,582 | 10/1992 | Tokoi | 358/31 |
| 5,170,248 | 12/1992 | Min | 358/31 |
| 5,227,880 | 7/1993 | Kim | 358/105 |

FOREIGN PATENT DOCUMENTS

63-131794 6/1988 Japan .

OTHER PUBLICATIONS

Miyazaki et al, "1989 National Meeting of the Television Society", Proceedings of ITEC 1989.
Mochizuki et al, "IDTV EDTV Signal Processing System", ITEJ Technical Report, vol. 12, No. 51, pp. 25-30.

Primary Examiner—Howard W. Britton
Attorney, Agent, or Firm—Cushman, Darby & Cushman

[57] ABSTRACT

A motion detecting circuit for a video signal processor having a filter arrangement for separating the video signal into the low and high frequency components, a first detecting circuit for detecting a low frequency luminance moving signal, a second detecting circuit for detecting a high frequency luminance moving signal, a third detecting circuit for detecting a chrominance moving signal, a first threshold circuit for generating a low band luminance motion digit signal, a second threshold circuit for generating a high band luminance motion digit signal, a control circuit coupled for generating a control signal in response to the low and high band luminance motion digit signals, a gate circuit for selectively transmitting the chrominance moving signal in response to the control signal and a selector for selectively outputting the one of the low frequency luminance moving signal and the chrominance moving signal having the high signal intensity.

13 Claims, 5 Drawing Sheets

Fig. 3.

| LOW FREQUENCY Y MOTION SIGNAL \ HIGH FREQUENCY Y MOTION SIGNAL | "H" LEVEL | "L" LEVEL |
|---|---|---|
| "H" LEVEL | ON | ON |
| "L" LEVEL | ON | OFF |

(LOGICAL OPERATION OF GATE CIRCUIT 22)

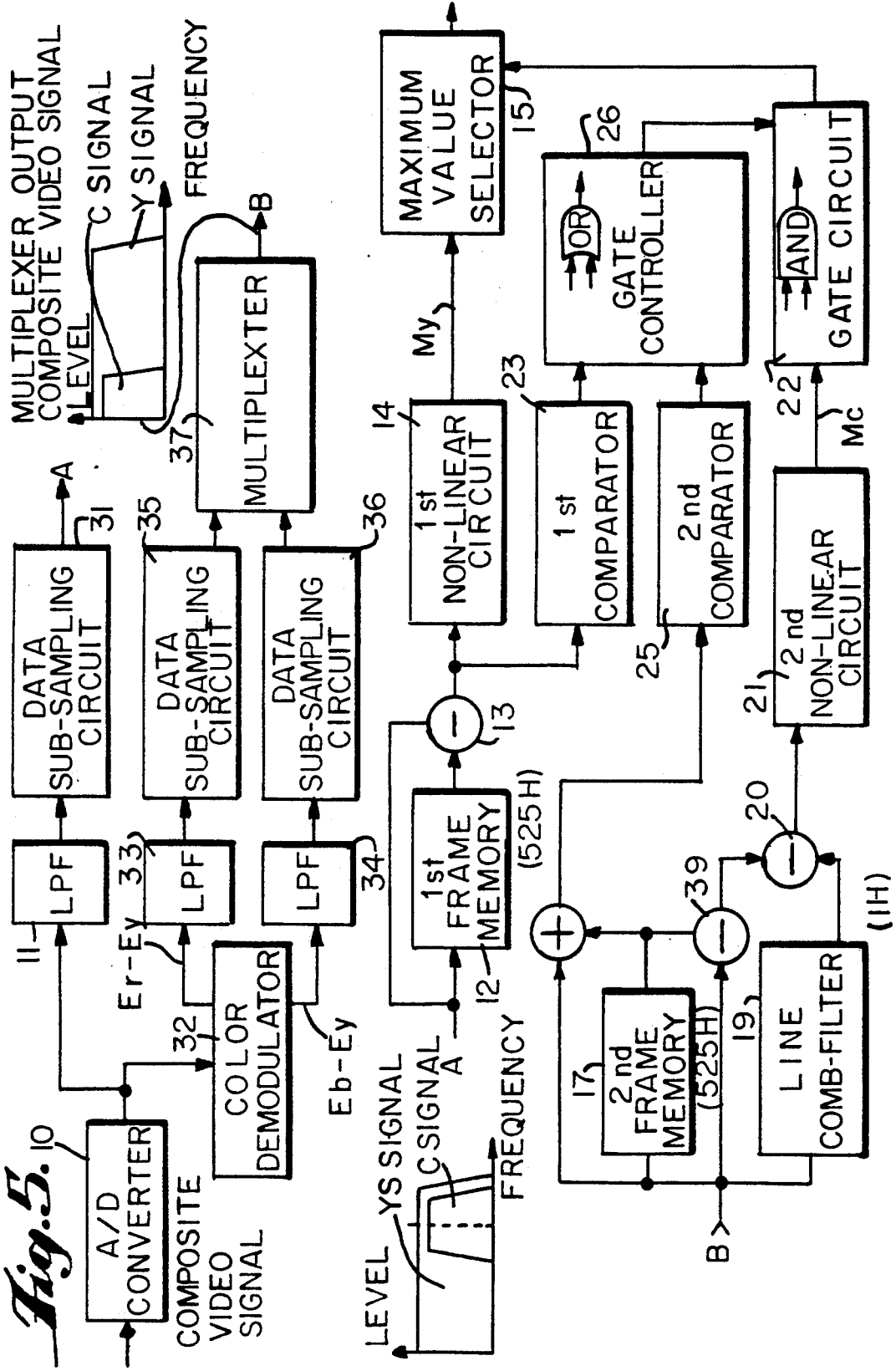

MOTION DETECTING CIRCUIT FOR VIDEO SIGNAL PROCESSOR

FIELD OF THE INVENTION

The present invention relates generally to a motion detecting circuit for video signal processors, and more particularly, to a motion detecting circuit which can be used with a Y/C separator for separating a luminance signal (Y) and a chrominance signal (C) in a video signal.

BACKGROUND OF THE INVENTION

In order to improve separation performance for a luminance signal (Y) and a chrominance signal (C), a motion adaptive three-dimensional Y/C separator has been incorporated in video processing equipment, such as TV receivers and VCRs. In these motion adaptive three-dimensional Y/C separators, a motion in a composite video signal is detected based on the magnitude of the inter-frame difference. This motion is then used for selecting between the processing of moving images and stationary images. Thus, a signal with a detected motion, i.e., a moving image, utilizes a Y/C separation implemented by an inter-line correlation, while a signal without such a detected motion, i.e., a stationary image, utilizes a Y/C separation implemented by an inter-frame correlation. Accordingly, in motion adaptive three-dimensional Y/C separators, precision of detecting motion has a significant influence on the performance of Y/C separation.

FIG. 1 shows a conventional video signal processor containing such a motion adaptive Y/C signal separation circuit. See, e.g., Miyazaki et al. "Development of Three-Dimensional Y/C Processing LSI", pp. 215-216, on Report in the 1989 National Meeting of the Television Society, the circuit of which will be incorporated herein as FIG. 1 for reference.

In FIG. 1, a composite video signal (e.g., NTSC signal) is applied to an A/D converter 102 through an input terminal 101. The A/D converter 102 converts the composite video signal to a digital form. The composite video signal is then applied to a moving image Y/C separation circuit 103 in a Y/C separation LSI 115. The moving image Y/C separation circuit 103 takes three consecutive line signals at a time, by using two 1H delay circuits ("H" represents one horizontal period) 104 and 105, to perform the Y/C separation for moving images. That is, the moving image Y/C separation circuit 103 first detects the vertical correlation of images from the horizontal low band components of the three consecutive line signals and then mixes two comblike filter outputs, based on the result of the vertical correlation, to obtain a vertical high frequency component (component not containing line correlation) for a center line signal and upper and lower line signals. The vertical high frequency component extracted by the moving image Y/C separation circuit 103 is then applied to a band-pass filter (hereinafter referred to as BPF) 106 wherein a color subcarrier band component is extracted from the vertical high frequency component. The color subcarrier band component is applied to both a subtracter 107 and a mixing circuit (hereinafter referred to as MIX circuit) 108 as a chrominance signal of moving images (hereinafter referred to the moving image C signal). The subtracter 107 receives another input from the 1H delay circuit 104 and subtracts the moving image C signal from the 1H delayed NTSC signal, thus resulting in a luminance signal of the moving image (hereinafter referred to as the moving image Y signal). This moving image Y signal is applied to another MIX circuit 109.

The NTSC signal on the output of the 1H delay circuit 104 is applied to a stationary image Y/C separation circuit 112 directly as well as through a one-frame delay circuit 110 with 525H (one-frame period) delay time. The stationary image Y/C separation circuit 112 separates a stationary image luminance signal (hereinafter referred to as the stationary image Y signal) by adding two frame signals with one-frame difference therebetween and a stationary chrominance signal component (frame non-correlative component) by subtracting the two frame signals. The stationary image Y signal separated in the stationary image Y/C separation circuit 112 is applied to the MIX circuit 109, while the chrominance signal component (frame non-correlative component) is applied to the MIX circuit 108 as the stationary chrominance signal (hereinafter referred to as the stationary image C signal) through another BPF 113.

The NTSC signal at the output of the 1H delay circuit 104 is applied to a motion detecting circuit 114. Furthermore the NTSC signal at the output of the one-frame delay circuit 110 is applied to the motion detecting circuit 114 directly as well as through another one-frame delay circuit 111 with 525H (one-frame period) delay time. Thus three consecutive frame signals obtained by the 1H delay circuit 104 and the two one-frame delay circuits 110 and 111 are applied to the motion detecting circuit 114. The motion detecting circuit 114 outputs the larger one of the motion signals detected based on an inter-frame difference between the outputs of the one-frame delay circuit 110 and the 1H delay circuit 104, and an inter-frame difference between the outputs of the 1H delay circuit 104 and the one-frame delay circuit 111. The motion signal from the motion detecting circuit 114 is applied to control terminals of the MIX circuits 108 and 109.

Thus the MIX circuit 109 receives the moving image Y signal and the stationary image Y signal, as well as the motion signal, as a control signal. The moving image Y signal and the stationary image Y signal are combined together at a ratio corresponding to the motion signal, so that a combined Y signal output from the MIX circuit 109 is obtained through a Y signal output terminal 116.

The MIX circuit 108 receives the moving image C signal and the stationary image C signal, as well as the motion signal, as a control signal. The moving image C signal and the stationary image C signal are combined together at the ratio corresponding tot he motion signal, so that a combined C signal output from the MIX circuit 108 is applied to a color processing LSI 117.

Additionally are shown synchronized processing LSI 140, abnormal detector 141, vertical and horizontal synchronized regenerator 142, feed forward ACC color filter and color phase adjustment 150, and burst detector 151.

In the conventional video signal processor, however, the motion detecting circuit 114 requires two large memories for configuring the one-frame delay circuits 110 and 111 as described above. Thus the conventional video signal processor has a disadvantage in cost and space for implementing the processor on IC chips.

SUMMARY OF THE INVENTION

It is, therefore, an object of the present invention to provide a motion detecting circuit for a video signal processor which can be constructed with less memory.

Another object of the present invention is to provide a motion detecting circuit for a video signal processor which is able to accurately detect a rapid motion of images.

In order to achieve the above objects, a motion detecting circuit for video signal processor according to one aspect of the present invention has a filter arrangement for separating the video signal into the low and high frequency components, a first detecting circuit for detecting a low frequency luminance motion signal based on an inter-frame difference of two successive frames of the low frequency component of the video signal, a second detecting circuit for detecting a high frequency luminance motion signal based on an inter-frame correlation of two successive frames of the high frequency component of the video signal, a third detecting circuit for detecting a chrominance motion signal based on an inter-frame correlation of two successive frames of the high frequency component, a first threshold circuit for generating a low band luminance motion digit signal when the low frequency luminance motion signal exceeds a first predetermined level, a second threshold circuit for generating a low band luminance motion digit signal when the high frequency luminance motion signal exceeds a second predetermined level, a control circuit coupled for generating a control signal in response to the low and high band luminance motion digit signals, a gate circuit for selectively transmitting therethrough the chrominance motion signal in response to the control signal and a selector for selectively outputting the one of the low frequency luminance motion signal and the chrominance motion signal having the high signal intensity.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 3 is a table showing the operation of the motion detecting circuit of FIG. 2;

FIG. 5 is a block diagram showing a third embodiment of the motion detecting circuit according to the present invention.

DESCRIPTION OF THE PREFERRED EMBODIMENTS

Figure 1:
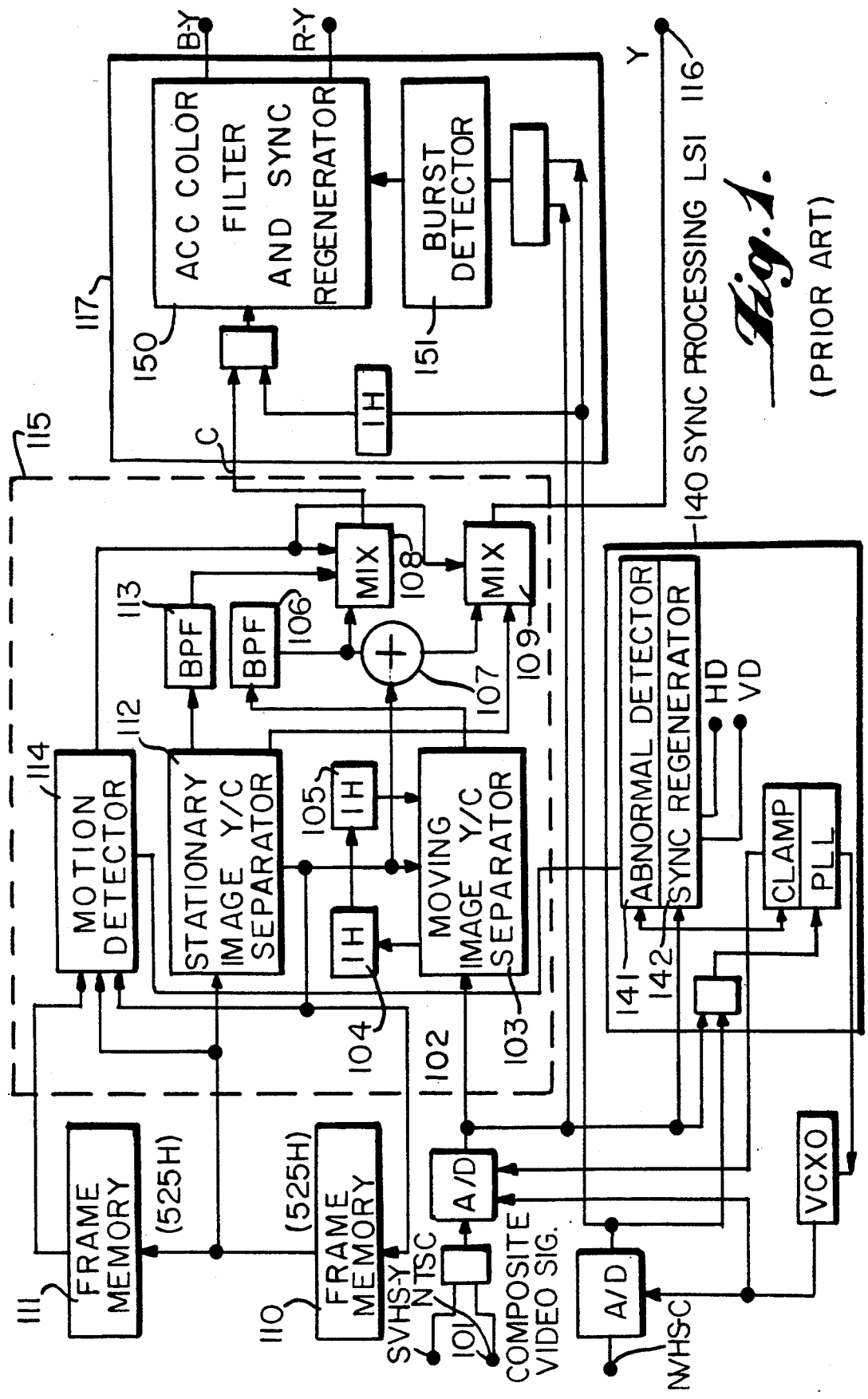
FIG. 1 is a block diagram showing a conventional video signal processor.

The present invention will be described in detail with reference to the FIGS. 2 through 5. Throughout the drawings, like or equivalent reference numerals or letters will be used to designate like or equivalent elements for simplicity of explanation.

Figure 2:
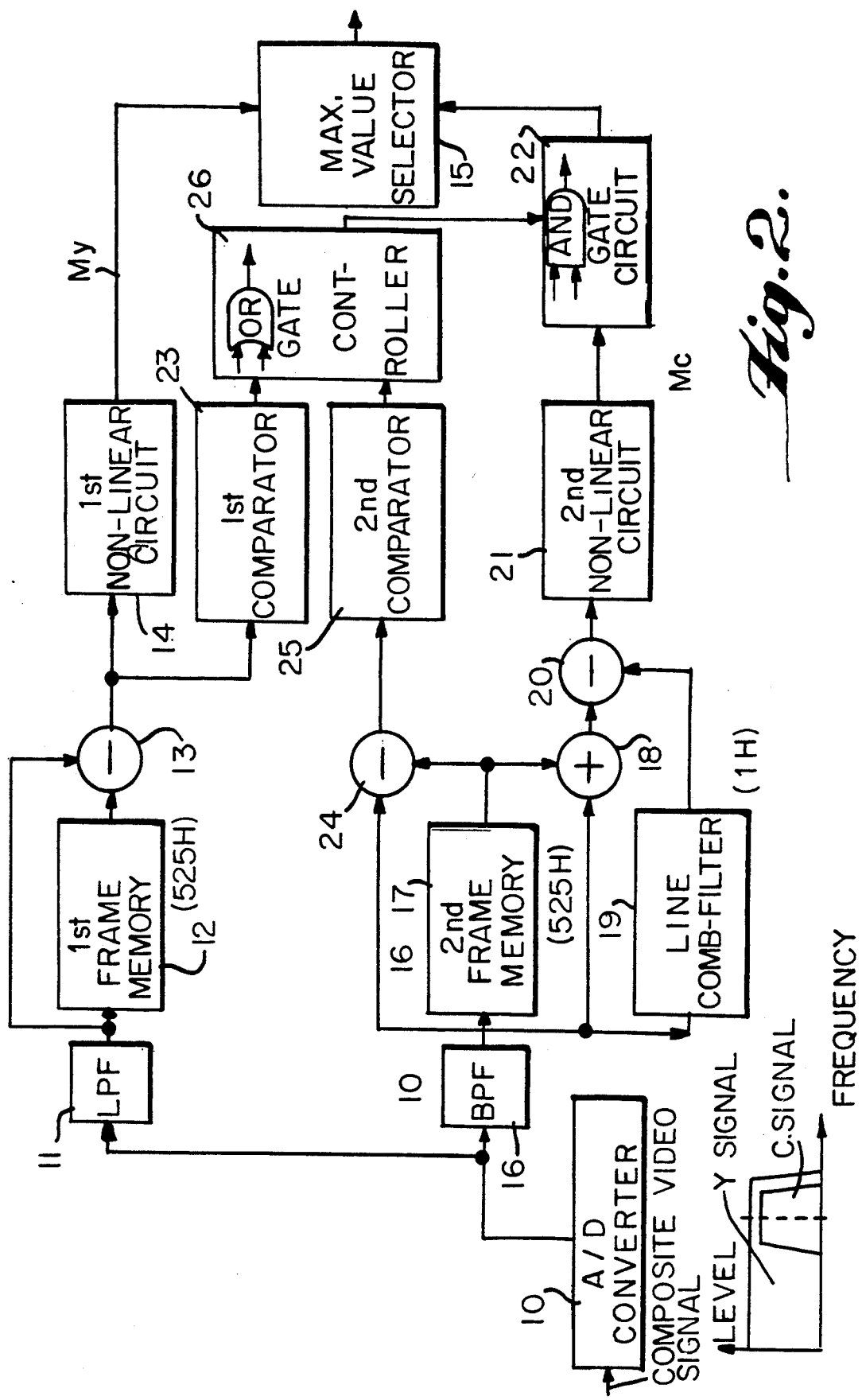
FIG. 2 is a block diagram showing a first embodiment of the motion detecting circuit according to the present invention.

Referring now to FIG. 2, a first embodiment of the motion detecting circuit according to the present invention will be described in detail. A composite video signal is applied to an A/D converter 10, and wherein converted into a digital form. The composite video signal in the digital form is then applied to a low-pass filter (hereinafter referred to as LPF) 11 and a band-pass filter (hereinafter referred to as BPF) 16. The LPF 11 has a filter characteristic for passing a low frequency band of the composite video signal, which includes a low frequency component of a luminance (Y) signal but not include a chrominance (C) signal. Thus, the low frequency component of the Y signal passes through the LPF 11. This low frequency band of the Y signal is applied to a first subtracter 13, directly and through a first frame memory 12. Thus, the combination of the first frame memory 12 and first subtracter 13 constitutes a first detecting means for extracting an inter-frame difference (hereinafter referred to as first inter-frame difference) of the output of the LPF 11, i.e., the low frequency component of the Y signal. This first inter-frame difference is applied to a first non-linear circuit 14 and a first threshold means constituted as a first comparator 23.

The first non-linear circuit 14 converts the first inter-frame difference into a first motion signal My with a desired performance. The first non-linear circuit 14 is configured to use the performance of the video signal wherein for a completely stationary image the inter-frame difference becomes zero, but for a moving image the inter-frame difference varies in proportion to the motion of the image within a finite range. The first motion signal My thus varies between 0 for the completely stationary image to 1 for a moving image. This first motion signal My is applied to a maximum value selector 15.

The composite video signal from the A/D converter 10 is applied to the BPF 16, as described above. The BPF 16 has another filter characteristic for passing the band of the chrominance (C) signal in the composite video signal. The signal in C band thus extracted from the BPF 16 is then applied to another frame-memory 17, an adder 18 and a second subtracter 24. The output of the second frame memory 17 is also applied to both of the adder 18 and the second subtracter 24. The second frame memory 17, the adder 18 and the second subtracter 24 constitute a well-known frame comb-filter in a well-known manner. Especially in this embodiment, the combination of the second frame memory 17 and the second subtracter 24 constitutes a second detecting means for extracting another inter-frame difference (hereinafter referred to as second inter-frame difference) of the output of the BPF 16, i.e., the high frequency component of the Y motion signal.

Further the combination of the second frame memory 24 and the adder 18 constitutes a third detecting means for extracting an inter-frame sum of the BPF 16, i.e., the signal in C band. Since the phase of the signal in C band alternately inverts with every successive frames, the output of the adder 18, i.e., an inter-frame sum becomes zero for a completely stationary image, or varies in proportion to the motion of the image within a finite range for a moving image.

The inter-frame sum output from the adder 18 still includes a stationary component of the Y signal, other than the signal in C band, as a noise. However, this stationary component of the Y signal is removed in a third subtracter 20 following the adder 18. That is, the inter-frame sum output from the adder 18 is applied to the third subtracter 20, while the corresponding stationary component of the Y signal in the output of the BPF 16 is applied to the third subtracter 20 through a line comb-filter 19. The line comb-filter 19 extracts a high frequency component of the Y signal using a line correlation of the Y signal. The high frequency component of the Y signal is then applied to the third subtracter 20 so that the stationary component of the Y signal is cancelled in the third subtracter 20. Accordingly, almost only the motion component of the signal in C band is obtained through the third subtracter 20, and applied into a second non-linear circuit 21.

The second non-linear circuit 21 converts the inter-frame sum into a second motion signal Mc with a desired performance. The second motion signal Mc becomes zero for a completely stationary image, but varies in proportion to the motion of the image within a finite value for a moving image. The second motion signal Mc thus varies between 0 for a completely stationary image to 1 for a moving image. This second motion signal Mc is applied to a the maximum value selector 15 through a gate circuit 22.

When the line comb-filter 19 operates erroneously, the second motion signal Mc output from the second non-linear circuit 21 cannot correctly represent the motion of the C signal. Then the gate circuit 22 operates to selectively passes the second motion signal Mc.

Now, the operation of the gate circuit 22 for selectively passing, i.e., gating the second motion detecting signal Mc will be described in detail. The gating operation of the gate circuit 22 is performed by using the first inter-frame difference representing the low frequency component of the Y motion signal and a second inter-frame difference of the high frequency component of the video signal extracted by the BPF 16. The first inter-frame difference is branched from the output of the first subtracter 13 and applied to a gate controller 26 through a first comparator 23. The second inter-frame difference is output from the second subtracter 24 which constitutes the frame comb-filter together with the second frame memory 17 and the adder 18. That is, the second inter-frame difference is obtained by subtracting the output of the second frame memory 17 from the output of the BPF 16. Since the phase of the signal in C band alternately inverts with every successive frames, as described before, the Y stationary signal is cancelled. So that the high frequency component of the Y motion signal is obtained from the second subtracter 24. The second inter-frame signal becomes zero for a completely stationary image, or varies in proportion to the motion of the image within a finite range for a moving image. The second inter-frame difference, i.e., the high frequency motion component of the Y signal is applied to the gate controller 26 through a second threshold means constituted as a second comparator 25.

The first comparator 23 produces an absolute value of the first inter-frame difference, i.e., the low frequency motion component of the Y signal, and then compares the absolute value of the low frequency motion component of the Y signal with a first predetermined threshold level. The first result of the comparison in the first comparator 23 is output as a 1 bit signal. This first comparison result is applied to the gate controller 26.

Similarly, the second comparator 25 produces an absolute value of the second inter-frame difference, i.e., the high frequency motion component of the Y signal, and then compares the absolute value of the high frequency motion component of the Y signal with a second predetermined threshold level. The second result of the comparison in the second comparator 25 is also output as a 1 bit signal. This second comparison result is applied to the gate controller 26.

When in the first comparator 23 it is determined that the low frequency motion component of the Y signal is lower than the first threshold level, the high frequency motion component of the Y signal, the same frequency band as the color subcarrier band, is also conceived to be small. As a result, the stationary image component of the Y signal contained in the second motion detecting signal from the second non-linear circuit 21 increases, while the motion component of the actual signal in C band decreases.

In this condition, the gate controller 26 selects the first comparison result to pass the result to gate circuit 22. The gate circuit 22 depresses the the second motion detecting signal from the second non-linear circuit 21 to zero value in response to the first comparison result. Thus, it is possible to prevent such erroneous operations in judging the stationary image as a moving image.

However the above operation provided by the first comparator 23 is still insufficient, because in a case where the Y signal component is almost stationary but the signal in C band is moving, the first comparator 23 fails to detect the motion of the signal in C band. Accordingly, the second comparator 25 is provided for compensating the detection of such a motion of the signal in C band.

As the phase of the signal in C band alternately inverts with every successive frames, as described before, the combination of the second frame memory 17 and the second subtracter 24 can extract only the signal in C band for the complete stationary image. The second inter-frame difference from the second subtracter 24 includes the motion component of the Y signal for the moving images.

When the second comparator 25 determines that the second inter-frame difference (i.e., the high frequency motion component of the Y signal) is larger than the second threshold level, the gate controller 26 selects the second comparison result from the second comparator 25 to pass the result to gate circuit 22. The gate circuit 22 then transmits the second motion signal Mc from the second non-linear circuit 21 to the maximum value selector 15 in response to the second comparison result applied in passing through the gate controller 26.

The reason for necessitating the control arrangement comprising the first comparator 23, the second comparator 25, the gate controller 26 and the gate circuit 22 will be described in detail below. If the signal in C band has a higher level, the stationary image component of the Y signal contained in the second motion detecting signal from the second non-linear circuit 21 decreases in reverse proportion to the the level of the signal in C band. Accordingly, there is a possibility of erroneously determining the stationary image component of the Y signal as he the motion component of the signal in C band decreases. In this case the second motion detecting signal Mc for the signal in C band is directly transmitted to the maximum value selector 15 for giving priority to a reliable detection of the moving image of the signal in C band.

In a case where the motion component of the Y signal is large, if a motion component of the signal in C band had been erroneously detected, the detected motion component of the signal in C band would not cause serious damage. Thus the motion component of the signal in C band can be directly transmitted to the maximum value selector 15.

In a case where in the second comparator 25 it is determined that the high frequency motion component of the Y signal from the second subtracter 24 is smaller than the second threshold level, the gate controller 26 selects the first comparison result from the first comparator 23 to pass the first comparison result to the gate circuit 22. The first and the second comparison results commonly take "H" level when the absolute values of the low and the high frequency motion components of the Y signal exceed the first and the second threshold levels, and take the "L" level when they are lower than the threshold levels. The gate controller 26 processes the logical sum of the first and the second comparison results to pass the logical sum to the gate circuit 22.

The gate circuit 22 comprises, e.g., an AND gate with one input coupled to the gate controller 26 and the other input coupled to the second non-linear circuit 21. Thus, the gate circuit 22 passes the second motion detecting signal Mc from the second non-linear circuit 21 to the maximum value selector 15, when the comparison result applied from the gate controller 26 has the "H" level. The gate circuit 22 makes the second motion detecting signal Mc zero when the first and the second comparison results have the "L" level, respectively.

Referring now to FIG. 3, the operation of the gate circuit 22 will be further discussed. When in the second comparator 25 the high frequency motion component of the Y signal is determined as higher than the second threshold level, the second comparison result takes the "H" level so that the result with the "H" level is applied to the gate controller 26. In this case the gate controller 26 selects the second comparison result at the "H" level, regardless of the first comparison result from the first comparator 23. The gate circuit 22 turns ON in response to the the second comparison result at the "H" level, so that the second motion detecting signal Mc from the second non-linear circuit 21 is directly transmitted to the maximum value selector 15 through the gate circuit 22.

When in the second comparator 25 the high frequency motion component of the Y signal is determined as lower then the second threshold level, the second comparison result takes the "L" level so that the result with the "L" level is applied to the gate controller 26. In this case the gate controller 26 selects the first comparison result from the first comparator 23 to pass the first comparison result to the gate circuit 22. Thus the gate circuit 22 operates in response to the first comparison result.

When in the first comparator 23 the first inter-frame difference, i.e., the low frequency motion component of the Y signal is determined as higher than the first threshold level, the first comparison result takes the "H" level so that the first comparison result with the "H" level is transmitted to the gate circuit 22 through the gate controller 26. In this case the gate circuit 22 selects the second motion detecting signal Mc from the second non-linear circuit 21 to pass the second motion detecting signal to the maximum value selector 15. On the other hand, when the low frequency motion component of the Y signal is determined as lower than the first threshold level, the first comparison result takes the "L" level so that the first comparison result with the "L" level is transmitted to the gate circuit 22 through the gate controller 26. In this case the gate circuit 22 depresses the second motion detecting signal Mc from the second non-linear circuit 21 to prohibit the second motion detecting signal Mc being transmitted to the maximum value selector 15. Thus in other words the gate circuit 22 deactivates the second non-linear circuit 21.

As described above, when the second inter-frame difference exhibiting the high frequency motion component of the Y signal is lower than the second threshold level, and the first inter-frame difference exhibiting the low frequency motion component of the Y signal is also lower than the first threshold level, the operation of the second non-linear circuit 21 is deactivated, so that the signal in C band is processed as the stationary image signal in spite of the presence of the motion detecting signal Mc for the signal in C band.

Now the maximum value selector 15 will be discussed in detail below. The maximum value selector 15 comprises, e.g., a comparator and a selector. The maximum value selector 15 compares the first motion detecting signal My applied from the first non-linear circuit 14 and the second motion detecting signal Mc from the second non-linear circuit 21 when the signal Mc passes through the gate circuit 22. The maximum value selector 15 then selects the larger one of the motion detecting signals My and Mc to output as an overall motion detecting signal.

The reason for selecting the larger one of the motion detecting signals My and Mc is that in the motion detection an erroneous operation of determining a moving image as a stationary image causes serious damage. For example, when in a motion-adaptive Y/C separation a stationary image is erroneously determined as a moving image, the stationary image component is processed for Y/C separation using a line correlation. Thus, in this case the performance of the Y/C separation is slightly deteriorated, but serious damages to display images caused by afterimages can be avoided.

On the other hand, when a moving image is erroneously determined as a stationary image, the motion component is processed for Y/C separation using frame correlation. In this case the motion component causes remarkable afterimages through the erroneous Y/C separation to seriously damage the display images.

The first embodiment illustrated in FIG. 2 can provide an advantage of reducing memory capacities for obtaining the first and second inter-frame differences and the inter-frame sum, in addition to the above-mentioned effects. Convention ally, video signal processors such as digital TV receivers, digital VCRs, EDTVs in current development, etc., use a 4 fsc (about 14.3 MHz, fsc represents the color subcarrier frequency; about 3.58 MHz) as a system clock. As the bandwidth of the signal in C band extends over ±1.5 MHz (or 3.0 MHz), a clock frequency of 2 fsc (around 7.16 MHz) can satisfy the sampling theorem to operate the frame memories (first frame memory 12 and second frame memory 17) well.

The required memory capacity for each the frame memories (first frame memory 12 and second frame memory 17) is proportional to the clock frequency. Thus if the above clock frequency of 2 fsc is utilized, the frame memories (first frame memory 12 and second frame memory 17) are halved in their memory capacities in comparison to conventional processors with 4 fsc clock.

Further the first embodiment obtains the motion detecting signal for the signal in C band based on the inter-frame difference, in comparison to conventional processors which had obtained such motion detecting signal for the signal in C band based on a difference across two frames. Thus the first embodiment can follow a rapid motion of images, and has the merit of reducing the memory capacity.

Figure 4:
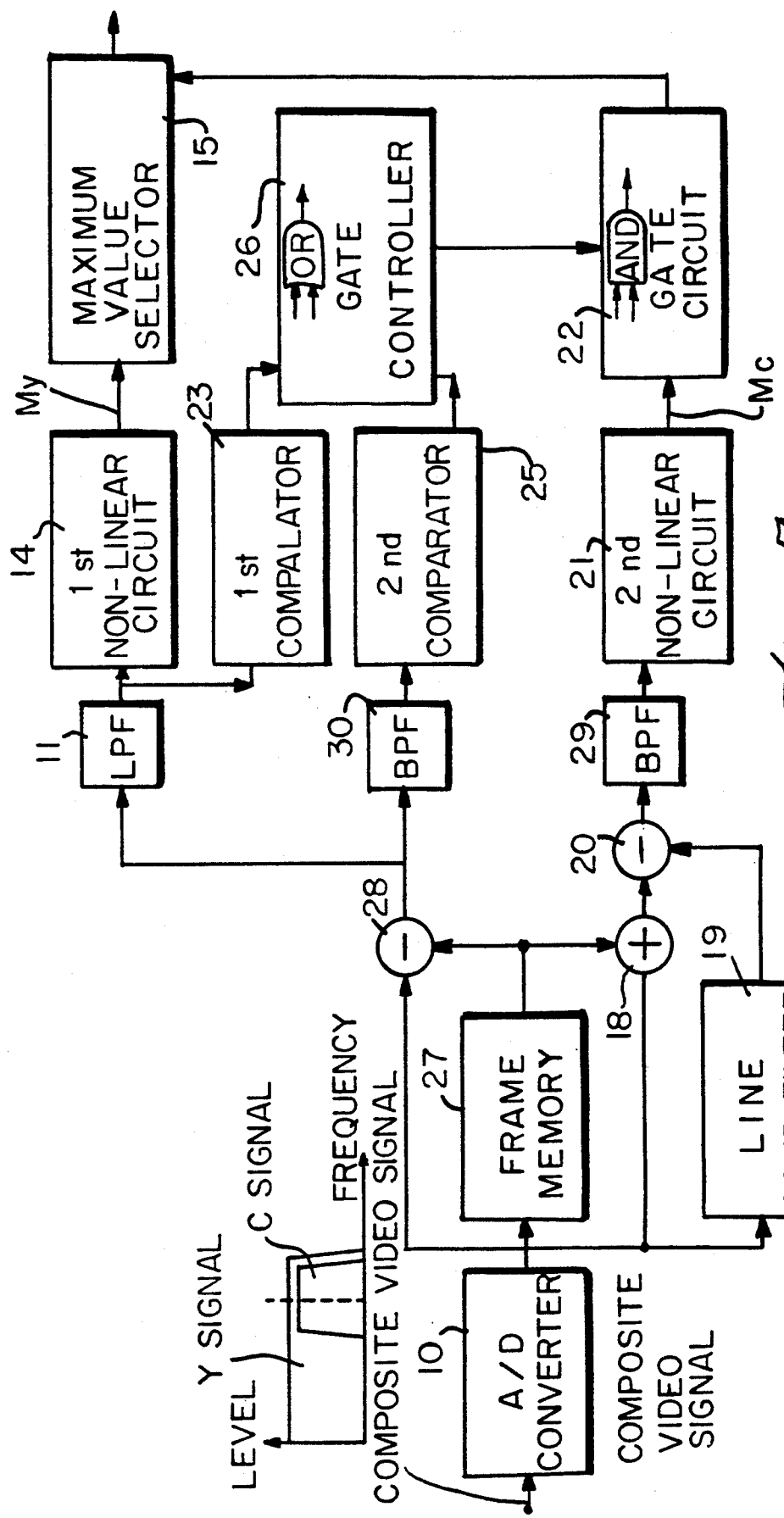
FIG. 4 is a block diagram showing a second embodiment of the motion detecting circuit according to the present invention.

Referring now to FIG. 4, a second embodiment of the motion detecting circuit for video signal processor according to the present invention will be described. The second embodiment is different from the first embodiment by that locations of filters and memories are reversed. Thus, other then these differences will be omitted in the following description of the second embodiment.

In FIG. 4, a composite video signal, which includes a luminance (Y) signal and chrominance (C) signal frequency-multiplexed on the higher band of the frequency range, is applied to an A/D converter 10, and wherein converted into a digital form. The composite video signal in the digital form is then applied to a frame-memory 27, an adder 18 and a first subtractor 28 (these elements 27, 18, 28 corresponds to the elements 17, 18, 24 of the first embodiment, see FIG. 2). The output of the frame memory 27 is also applied to both of the adder 18 and the first subtractor 28. The frame memory 27, the adder 18 and the first subtractor 28 constitute a frame comb-filter in a well-known manner.

The combination of the frame memory 27 and the first subtracter 28 produces an inter-frame difference of the composite video signal. Since the phase of the Y signal is maintained non-inverted with every successive frames, the output of the first subtracter 28, i.e., the inter-frame difference of the composite video signal becomes zero for a completely stationary image, or varies in proportion to the motion of the image within a finite range for a moving image. Accordingly, the inter-frame difference exhibits a motion component of the Y signal. Further, thes inter-frame difference also contains the stationary component of the signal in C band.

The inter-frame difference exhibiting the motion component of the Y signal is applied to both an LPF 11 and a first BPF 30 (these elements 11, 30 corresponds to the elements 11, 16 of the first embodiment, see FIG. 2). The LPF 11 has a filter characteristic for passing a low frequency band of the inter-frame difference exhibiting the motion component of the Y signal. Accordingly, this low band signal almost corresponds to the low frequency motion component of the Y signal obtained from the first subtracter 13 of the first embodiment. The low band signal in the output of the LPF 11 is applied to both a first non-linear circuit 14 and a first comparator 23.

The first BPF 30 has another filter characteristic for passing the band of the signal in C band in the composite video signal. Thus, the high frequency band of the inter-frame difference exhibiting the motion component of the Y signal and exhibiting the stationary image component of the signal in C band is obtained in the output of the first BPF 30. The high band signal in the output of the first BPF 30 is applied to a second comparator 25.

The combination of the frame memory 27 and the adder 18 produces an inter-frame sum of the composite video signal. Since the phase of the signal in C band alternately inverts with every successive frames, the output of the adder 18, i.e., the inter-frame sum of the composite video signal becomes zero for a completely stationary image, or varies in proportion to the motion of the image within a finite range for a moving image.

The inter-frame sum output from the adder 18 still includes a stationary component of the Y signal, other than the signal in C band, as a noise. However, this stationary component of the Y signal is removed in a second subtracter 20 following the adder 18. That is, the inter-frame sum output from the adder 18 is applied to the second subtracter 20, while the corresponding stationary component of the Y signal in the composite video signal at the output of the A/D converter 10 is applied to the second subtracter 20 through a line comb-filter 19. The line comb-filter 19 extracts the Y signal using a line correlation of the Y signal. The Y signal is then applied to the second subtracter 20 so that the stationary component of the Y signal is cancelled in the second subtracter 20. Accordingly, almost only motion component of the signal in C band is obtained through the second subtracter 20, and applied to a second BPF 29. The second BPF 29 has a filter characteristic for passing the band of the signal in C band in the composite video signal. Thus, the motion component of the signal in C band is applied to a second non-linear circuit 21.

The first and the second non-linear circuits 14 and 21, the first and the second comparators 23 and 25 and other elements following those are equivalent to those in the first embodiment so that they operate in the same manner.

The second embodiment illustrated in FIG. 4 can also provide an advantage of reducing memory capacities for obtaining the inter-frame difference exhibiting the motion component of the Y signal and the motion component of the signal in C band, in addition to the above-mentioned erroneous operation preventing effects.

As described in the above and illustrated in FIG. 4, the second embodiment comprises only one frame memory 27. Thus, the second embodiment can be halved the memory capacity in comparison to conventional processors, regardless of the frame memory 27 utilizing the clock frequency of 4 fsc (around 14.3 Mhz).

Further the second embodiment obtains the motion detecting signal for the signal in C band based on the frame correlation, in comparison to conventional processors which had obtained such motion detecting signal for the signal in C band based on a difference across two frames. Thus in similar to the first embodiment the second embodiment can follow a rapid motion of images, and has the merit of reducing the memory capacity.

Referring now to FIG. 5, a third embodiment of the motion detecting circuit for video signal processor according to the present invention will be described. The third embodiment is different from the first embodiment by that a color demodulation arrangement is provided between the A/D converter and the frame memories. Thus, other then these differences will be omitted in the following description of the third embodiment.

In FIG. 5, a composite video signal, which includes a luminance (Y) signal and a chrominance (C) signal frequency-multiplexed on the higher band of the frequency range, is applied to an A/D converter 10, and wherein converted into a digital form. The composite video signal in the digital form is then applied to a color demodulator 32. The color demodulator 32 demodulates two color difference signals Er-Ey and Eb-Ey, including the Y signal as frequency-multiplexed thereon. These color difference signals Er-Ey and Eb-Ey are applied to LPFs 33 and 34. The LPFs 33 and 34 extract low frequency components of the color difference signals Er-Ey and Eb-Ey.

These low frequency components of the color difference signals Er-Ey and Eb-Ey extracted from the LPFs 33 and 34 have frequency bands narrower than the composite video signal in the output of the A/D converter 10. Then, these low frequency color difference signals Er-Ey and Eb-Ey are applied to data sub-sampling circuits 35 and 36 wherein the signals Er-Ey and Eb-Ey are properly sub-sampled their data, so that the frequency of the clock signal required for processing the color difference signals Er-Ey and Eb-Ey can be lowered. The outputs of the data sub-sampling circuits 35 and 36 are then applied to a multiplexer 37 wherein the color difference signals Er-Ey and Eb-Ey with reduced data are multiplexed to a sequential signal on one-channel.

This multiplexed color difference signal is applied to a first section for processing the signal in C band, the first section being equivalent to the section for processing the signal in C band in the first embodiment. Thus the details of the circuit construction of the first section and its operation will be omitted hereinafter.

The composite video signal in the digital form is further applied into an LPF 11 which corresponds to the same LPF 11 in the first embodiment (see FIG. 2). Thus the low frequency component of the Y signal is extracted from the digital form composite video signal. The low frequency component of the Y signal is applied to the second section for processing the Y signal through another data sub-sampling circuit 31, the second section being equivalent to the section for processing the Y signal in the first embodiment. Thus the details of the circuit construction of the second section and its operation will be omitted hereinafter. In the data sub-sampling circuit 31 the low frequency component of the Y signal is properly sub-sampled its data, so that the frequency of the clock signal required for processing the low frequency component of the Y signal can be lowered.

The third embodiment illustrated in FIG. 5 can also provide an advantage of reducing memory capacities for obtaining the inter-frame difference exhibiting the motion component of the Y signal and the motion component of the signal in C band, in addition to the above-mentioned erroneous operation preventing effects.

The C signal bandwidth is ±1.5 MHz as described before. Thus two demodulated color difference signals in the outputs of the color demodulator 32 are reduced their frequency bands to 1.5 MHz by the LPFs 33 and 34. The signals are further reduced their data in the data sub-sampling circuits 35 and 36. Thus, the clock frequency may be lowered to fsc for the data sub-sampling circuits 35 and 36, while the clock frequency is raised twice (i.e., 2 fsc) for the multiplexer 37 thus satisfying the sampling theorem to operate the frame memory 17 well.

The Y signal in the output of the A/D converter 10 is limited to 2 MHz in the LPF 11. The Y signal is further reduced its data in the data sub-sampling circuit 31. Thus, if the clock frequency for processing the Y signal can be set to 2 fsc, it is satisfying the sampling theorem to operate the frame memory 12 well.

The required memory capacity for each the frame memories 12 and 17 is proportional to the clock frequency. Thus if the above clock frequency of 2 fsc is utilized, the frame memories 12 and 17 are halved in their memory capacities in comparison to conventional processors with 4 fsc clock.

Further the third embodiment obtains the motion detecting signal for the signal in C band based on the frame correlation, in comparison to conventional processors which had obtained such motion detecting signal for the signal in C band based on a difference across two frames. Thus in similar to the first embodiment the third embodiment can follow a rapid motion of images, and has the merit of reducing the memory capacity.

As described above, the present invention can provide an extremely preferable motion detecting circuit for a video signal processor.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention include all embodiments falling within the scope of the appended claims.

What is claimed is:

1. A motion detecting circuit for a video signal processor, comprising:

means for receiving a composite video signal having a low frequency band containing only a low frequency component of a luminance signal and a high frequency band containing both a high frequency component of the luminance signal and a chrominance signal superposed on the high frequency component of the luminance signal;

filter means coupled to the receiving means for separating the video signal into the low and high frequency components;

first detecting means coupled to the filter means for detecting a low frequency luminance motion component based on an inter-frame correlation of two successive frames of the low frequency component of the video signal;

second detecting means coupled to the filter means for detecting a high frequency luminance motion component based on an inter-frame difference of two successive frames of the high frequency component of the video signal;

third detecting means coupled to the filter means for detecting a chrominance motion signal based on an inter-frame correlation of two successive frames of the high frequency component of the video signal;

first threshold means coupled to the first detecting means for generating a low band luminance motion digit signal when the low frequency luminance moving signal exceeds a first predetermined level;

second threshold means coupled to the second detecting means for generating a low band luminance motion digit signal when the high frequency luminance moving signal exceeds a second predetermined level;

control means coupled to the first and second threshold means for generating a control signal in response to the low and high band luminance motion digit signals;

gate means coupled to the third detecting means and the control means for selectively transmitting therethrough the chrominance moving signal in response to the control signal; and selection means coupled to the first detecting means and the gate means for selectively outputting the one of the low frequency luminance moving signal and the chrominance moving signal having the high signal intensity.

2. A motion detecting circuit for a video signal processor as claimed in claim 1, further comprising a first non-linear circuit coupled to the first detecting means for providing a first predetermined non-linear input-output characteristic for the low frequency luminance moving signal and second non-linear circuit coupled to the third detecting means for providing a second predetermined non-linear input-output characteristic for the chrominance moving signal.

3. A motion detecting circuit for a video signal processor as claimed in claim 1, the filter means includes a low pass filter for outputting the low frequency component of the video signal and a band pass filter for outputting the high frequency component of the video signal.

4. A motion detecting circuit for a video signal processor as claimed in claim 1, wherein the third detecting means includes means for removing a high frequency luminance component.

5. A motion detecting circuit for a video signal processor as claimed in claim 1, the control means includes a logic gate for outputting the control signal exhibiting an OR logic of the low and high band luminance motion digit signals.

6. A motion detecting circuit for a video signal processor as claimed in claim 5, wherein the OR logic exhibits L level for deactivating the gate means when both the first and second threshold means yield L level.

7. A motion detecting circuit for a video signal processor, comprising:

means for receiving a video signal having a low frequency band containing a low frequency component of a luminance signal and a high frequency band containing both a high frequency component of the luminance signal and a chrominance signal superposed on the high frequency component of the luminance signal;

first detecting means coupled to the receiving means for detecting a luminance moving signal based on an inter-frame correlation of two successive frames of the video signal;

second detecting means coupled to the receiving means for detecting a chrominance moving signal based on an inter-frame correlation of two successive frames of the video signal;

first filter means coupled to the first detecting means for separating the luminance moving signal into low and high frequency luminance moving signals;

second filter means coupled to the second detecting means for removing the luminance signal component from the chrominance moving signal;

first threshold means coupled to the first filter means for receiving the low frequency luminance moving signal and for generating a low band luminance motion digit signal when the low frequency luminance moving signal exceeds a first predetermined level;

second threshold means coupled to the first filter means for receiving the high frequency luminance moving signal and for generating a high band luminance motion digit signal when the high frequency luminance moving signal exceeds a second predetermined level;

control means coupled to the first and second threshold means for generating a control signal in response to the low and high band luminance motion digit signals;

gate means coupled to the second detecting means and the control means for selectively transmitting therethrough the chrominance moving signal in response to the control signal; and selection means coupled to the first filter means and the gate means for selectively outputting the one of the low frequency luminance moving signal and the chrominance moving signal having the high signal intensity.

8. A motion detecting circuit for a video signal processor as claimed in claim 7, the filter means includes a low pass filter for outputting the low frequency component of the luminance moving signal and a band pass filter for outputting the high frequency component of the luminance moving signal.

9. A motion detecting circuit for a video signal processor as claimed in claim 8, further comprising a first non-linear circuit coupled to the low pass filter for providing a first predetermined non-linear input-output characteristic for the low frequency luminance moving signal and second non-linear circuit coupled to the second filter means for providing a second predetermined non-linear input-output characteristic for the chrominance moving signal.

10. A motion detecting circuit for a video signal processor as claimed in claim 7, the control means includes a logic gate for outputting the control signal exhibiting an OR logic of the low and high band luminance motion digit signals.

11. A motion detecting circuit for a video signal processor as claimed in claim 10, wherein the OR logic exhibits L level for deactivating the gate means when both the first and second threshold means yield L level.

12. A motion detecting circuit for a video signal processor as claimed in claim 7, wherein the second filter means includes a band pass filter for selectively passing therethrough the chrominance moving signal.

13. A motion detecting circuit for a video signal processor as claimed in claim 12, wherein the second filter means further includes means for cancelling a high frequency luminance component contained in the output from the second detecting means.

* * * * *